March 29, 1927.                    1,622,556
E. WILDHABER
CURVED TOOTH GEAR
Original Filed May 11, 1925    2 Sheets-Sheet 1

INVENTOR
Ernest Wildhaber
BY
ATTORNEY

March 29, 1927.
E. WILDHABER
1,622,556

CURVED TOOTH GEAR

Original Filed May 11, 1925   2 Sheets-Sheet 2

INVENTOR
Ernest Wildhaber
BY
ATTORNEY

Patented Mar. 29, 1927.

1,622,556

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

CURVED-TOOTH GEAR.

Original application filed May 11, 1925, Serial No. 29,552. Divided and this application filed March 4, 1926. Serial No. 92,167.

The present invention relates to gears and in particular to gears which mesh with axes non-intersecting and non-parallel.

One object of the present invention is to provide a pair of gears in which will be combined, with the adaptability of gears which mesh with their axes non-intersecting and non-parallel, the smoothness of operation characteristic of longitudinally curved tooth gears.

A further object of the invention is to provide a pair of gears having longitudinally curved teeth and adapted to operate with axes non-intersecting and non-parallel which can be readily produced and which will be efficient in operation.

Other objects of the invention will be apparent in the course of the specification and from the recitation of the appended claims.

With the above and other objects in view, the invention resides in the various novel features peculiar to the new gears which are described hereinafter in the specification, illustrated in the accompanying drawings and set forth in the appended claims.

This application is a division of my copending application Serial No. 29,552, filed May 11, 1925.

The superiority of curved tooth bevel gears to straight tooth gears of the same type is well recognized and is borne out by their almost universal adoption as the final drive for automobiles. Ordinary curved tooth bevel gears are restricted in their use, however, to drives in which the axes are intersecting.

The present invention aims to make available the qualities which characterize curved tooth bevel gears in a drive in which the mating gears are arranged with axes non-intersecting and non-parallel and in which such mating gears are of comparatively simple structure and may be produced at a comparatively low cost. In the preferred form of my invention, one member of the hypoid pair will have a substantially constant profile and the other member will be made conjugate to it. Uniformity of profile means that the pressure angle of the teeth of the member so constructed will be substantially the same at both ends thereof. One member of the new pair, moreover, and preferably the larger member will, preferably, be formed by a method in which the cutting edge contacts the whole finished tooth surface of said member, that is, said member will preferably be non-generated and the generating process confined to one member of the pair only. This means a great saving in production time and costs.

The new gears will preferably be so proportioned as to contact substantially along the entire tooth surface of one member of the pair, whereby the teeth of both members will have maximum strength. The teeth of one member along its length will match the tooth spaces of the other member, the width of the teeth of one member being throughout their length substantially equal to the width of the tooth spaces of the other member. The new gears will resemble curved tooth bevel gears in certain respects and worm gears in others. Besides this, they will have certain characteristics of their own. They will slide while in mesh, thus tending to quietness and to preserve the desired tooth forms. They have the further advantage that the pinion may be increased in size and strength over a corresponding bevel pinion of the same ratio, which quality makes the new pair especially valuable at large ratios. The new gears, accordingly, will have increased life and increased strength and can be produced more readily and will operate much more quietly than hypoid gears of types heretofore known.

Figure 1:
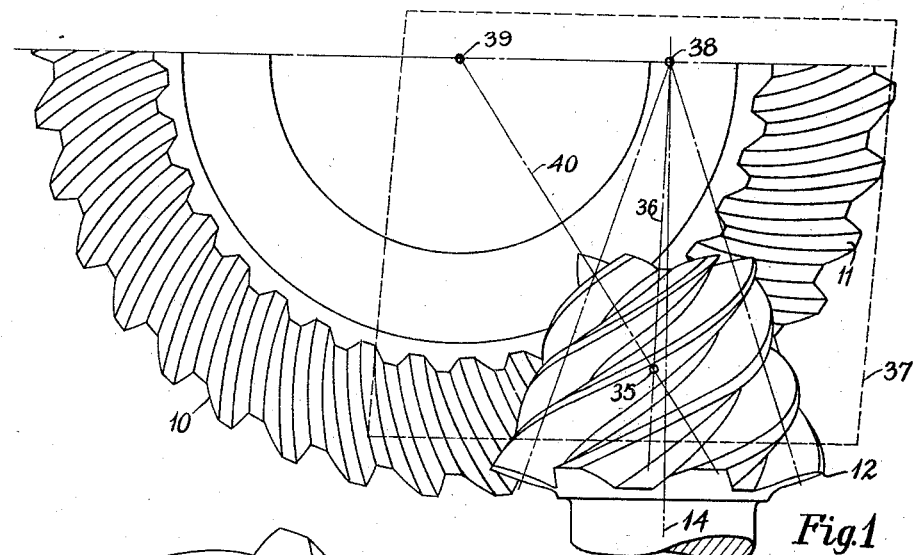
Figure 1 is a fragmentary plan view, illustrating a pair of gears constructed according to one embodiment of my invention.
Figure 2:
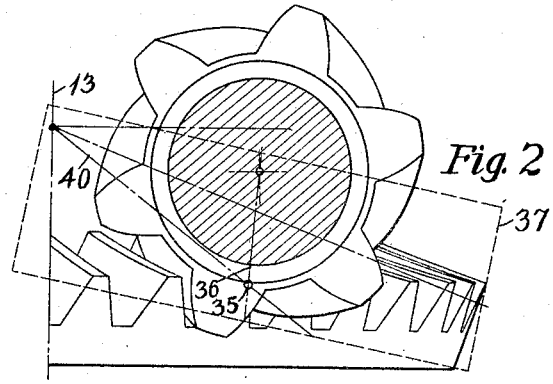
Figure 2 is an end view of the pair shown in Figure 1.
Figure 3:
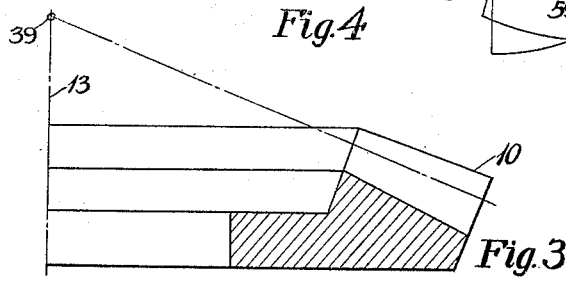
Figure 3 is an axial section of the gear, or larger member of the pair, illustrated in Figures 1 and 2.

Referring to Figures 1, 2 and 3, where a pair of gears produced according to one embodiment of my invention is shown, it will be seen that the gear 10 is provided with longitudinally curved teeth 11 which are of constant profile through their length. The pinion 12 is also provided with longitudinally curved teeth and is so placed with respect to the gear 10 that the axes 13 and 14 of the gear and pinion, respectively, are offset from each other.

One method of producing a pair of curved tooth gears according to this invention is illustrated in Figures 8 to 12 inclusive. For producing the gear, the blank 20 is held stationary and the tool 21, preferably a rotary cutter, having its cutting blades 22 annularly arranged, such as the cutter described more particularly in Patent No. 1,236,834, granted to James E. Gleason, August 14, 1917, is rotated on its axis 23 while in engagement with the blank, thus sweeping out a curved tooth space in the blank. The blank is then indexed and a different tooth space then produced.

Figure 10:
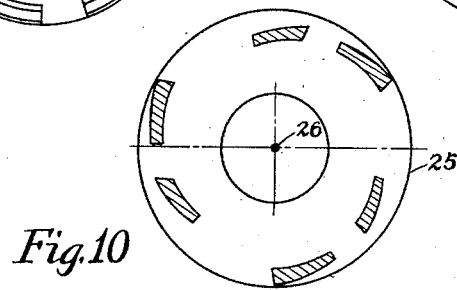
Figure 10 is a plan view of a tool which may be used to produce gears or pinions according to another embodiment of my invention.

Another method for producing the gear consists in using a tool 25, such as that illustrated in Figure 10, and imparting to the blank a continuous indexing motion during the cutting operation. The tool illustrated in Figure 10 is more particularly described in the patent to Gleason and Stewart, No. 1,249,378, December 11, 1917. Such a tool will be rotated on its axis 26, while the blank instead of being held stationary, as when the tool 21 is used, will also be rotated on its axis and in timed relation with the rotation of the tool so that successive pairs of cutting blades of the tool will enter different and preferably successive tooth spaces in the blank. The teeth of the blank will thus all be finished simultaneously.

The tooth surfaces of the pinion may be produced by rotating a tool, representing the mate gear or wheel, in engagement with a pinion blank while rotating the blank on its axis and simultaneously imparting an additional relative movement between tool and blank about an axis representing the axis of the mate gear, while maintaining the axis of the pinion blank in proper offset relation to the axis of the mate gear. When a tool, such as the tool 21, is employed to cut the gear or wheel, the pinion may be cut with a tool, such as shown at 27, having an effective cutting portion $27^1$ conjugate to the cutting portion $21^1$ of the tool 21. When the gear or wheel, is cut with a tool, such as the tool 25, the pinion will be cut with a conjugate tool. The above described method of cutting the gear will ordinarily result in teeth of parallel depth. It is, however, also possible to use the same tool on gear and pinion and cut tapering depth, by applying the principles used for cutting bevel gears with teeth of tapering depth. One method of producing the pinion is illustrated, diagrammatically, in Figures 11 and 12, where the tool 27, conjugate to the tool 21 used to cut the gear, is rotated on its axis 28 while the blank 29 is rotated on its axis 30 and while an additional relative movement is effected between tool and blank about the axis 31 of the mate gear, the pinion axis 30 being maintained all the while in offset relation to the axis 31 of the mate gear. When the pinion is cut with a tool, such as the tool 25, the pinion blank will be rotated continuously in timed relation with the rotation of the tool, the blank being thereby continuously indexed and all its teeth finished simultaneously. The other relative motions of tool and blank will be the same as when the tool 27 is employed.

While a rotary cutter will preferably be used in producing gears constructed according to this invention, it is obvious that a reciprocating tool may be employed instead or any other form of tool which will produce the desired longitudinal tooth curvature. One side of a tooth space may be cut at a time or two adjacent tooth sides may be cut simultaneously. The surface produced on the gear 20 by the method illustrated in Figures 8 and 9 will be a surface of revolution. The surface produced on a gear by the method described with relation to the tool shown in Figure 10 will approach a roulette curve and might be termed a modified roulette.

A gear pair produced according to this invention may be of any suitable proportions. It is desirable, however, for the purposes of securing a drive in which both members have the requisite strength, that the pair be so proportioned that the members thereof will contact along the entire tooth surface of one member of the pair, and that undercut is avoided or uniformly kept down along the whole length of the teeth. The desired tooth contact can be obtained, as will be clear from Figure 1, and has been more fully discussed in my companion application, Serial No. 29,553, filed May 11, 1925 and in my companion application, Serial No. 92,168, filed March 4, 1926, when the mesh between the gears 10 and 12 extends generally in the direction of the pinion axis 14. The mesh between the gears will extend generally in the direction of the pinion axis when the axis 14 projected into a plane tangent to the pitch surfaces of gear and pinion at a common contact point is tangent to the line of action between the two gears.

In development, the pitch lines of gear pairs necessarily mesh like ordinary tooth profiles and are subject to the known requirements of tooth profiles. As is well known, a point of contact between mate longitudinal tooth curves or profiles may be located by drawing from the pitch point, or point of contact of the rolling circles of the two gears in development, a perpendicular or normal to the longitudinal tooth curve or profile. Vice versa, it is also known that the pitch point can always be located as the point of intersection of the line connecting the gear apexes or centers in development with the tooth normal. It can be demonstrated mathematically or graphically, as has been shown for instance in the companion applications above referred to, that in a pair of hypoid gears, in development, the tooth normal may be considered as having an instantaneous center which lies at the point of intersection of a perpendicular to said normal at the pitch point with a line drawn through the center of tooth curvature passing through the apex of the gear. It can also be demonstrated mathematically or graphically as has been shown in the companion applications mentioned, that a tangent to the line of action between a pair of hypoid gears is perpendicular to a radius drawn from said instantaneous axis. With these facts in mind, we can assume the axis of the pinion projected into a plane tangent to the pitch surfaces of the mating gears as tangent to the line of action between the gears. Under these circumstances, the line of mesh between the two gears would extend in the general direction of the pinion axis. What remains to be determined is how to proportion a hypoid pair so that the assumed conditions will be realized.

To determine the required data we may assume as one of the known factors either the radius of longitudinal tooth curvature of the gear or some other quantity as the distance of the pinion apex from the mean contact point between the gears or another equivalent quantity in addition to the tooth inclination or spiral angle. The necessary data can then be determined by analyzing the mesh of the hypoid pair in a plane tangent to their pitch surfaces at the common contact point. This plane is indicated at 37 in Figure 4, being a plane tangent to the pitch surfaces of mating gears at the common contact point 35. In this plane, 39 is the center or apex of the gear or wheel. Let us assume the location of the pinion apex 38. We can now locate the center of longitudinal tooth curvature, that is determine the radius of the longitudinal tooth curvature. In the plane 37, 36 and 40 are, respectively, the projections of pinion and gear axes. 41 represents the pitch line or longitudinal tooth curve of the gear or wheel and 42 a tooth normal at the contact point 35. The intersection point 43 between the line 44, connecting the centers or apexes 39 and 38, and the tooth normal 42, as is well known, is the pitch point of the pair in development or the point of contact of the rolling circles of the two gears in development.

By erecting a perpendicular 45 to the tooth normal at the pitch point 43 and by intersecting the same with a perpendicular 46 to the projected pinion axis 36 at the contact point 35 we obtain the intersection point 47 which, as has already been stated and as has been more fully disclosed in the companion applications referred to, is the instantaneous center of motion of the tooth normal. As previously stated, a line drawn from this point 47 to the gear center 39 intersects the tooth normal 42 at the center 48 of the longitudinal tooth profile 41. The location of the center of tooth curvature can, therefore, be determined from the plane of development 37, knowing the location of the gear apex and assuming the location of the pinion apex. In other words, we can assume the location of the pinion apex with reference to the common contact point between the mating gears and from the plane tangent to their pitch surfaces at this contact point determine what the radius of tooth curvature should be to secure a mesh between gear and pinion which will extend substantially along the entire length of the tooth surface of one member of the pair. Instead of assuming the location of the pinion apex, we might assume the location of the center of tooth curvature and from the relation in the plane 37 determine what the location of the pinion apex should be to secure the desired mesh.

To determine the cone angles of the pair, let $a'$ be the cone angle of the gear and $a''$ be the cone angle of the pinion, and $N'$ and $N''$ be the tooth numbers of gear and pinion respectively. In development the pitch surface of a gear will not occupy a full circumference. The tooth number of the full circumference, in development, bears the same relation to the actual tooth number $N'$ or $N''$, as the tooth number of a crown gear is to the tooth number of a bevel gear. Hence the tooth numbers of the full circumference, in development, of gear and pinion, respectively, are:

$$\frac{N'}{\sin a'} \text{ and } \frac{N''}{\sin a'''}.$$

The ratio of gear and pinion tooth numbers in development equals the ratio of the distances of the respective centers 39 and 38 from the pitch point 43. This known ratio is called A. Hence:

$$\frac{N'}{\sin a'} : \frac{N''}{\sin a''} = A \text{ or } \frac{N'}{N''} \cdot \frac{\sin a''}{\sin a'} = A. \quad (1)$$

A further requirement is, that the axes of the pair, which are projected into lines 40 and 36, respectively, are at a given angle to each other, which is preferably a right angle. The arrangement of the gears with axes at right angles can be expressed by the formula:

$$\tan a' \times \tan a'' = \cos b, \quad (2)$$

where $b$ is the angle included between the projected axes 36 and 40.

These two equations furnish the following solution:

$$\sin^2 a'' = \sqrt{\frac{C_1^2}{4} + C_2} - \frac{C_1}{2} \quad (3)$$

where:

$$C_1 = \cotan^2 b \times \left[ \left(\frac{N''}{N'}\right)^2 A^2 + 1 \right]$$

$$C_2 = \cotan^2 b \times \left[ \left(\frac{N''}{N'}\right)^2 A^2 \right].$$

The cone angles $a''$ and $a'$ may, therefore, be determined from either equation (1) or (2).

Figure 4:
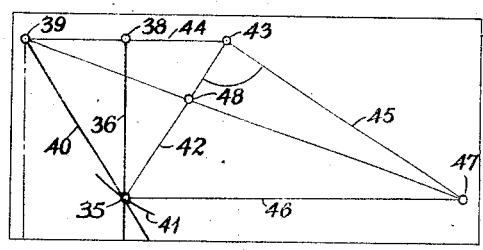
Figure 4 is a diagrammatic view, showing the relations and proportions of two gears constructed according to a preferred form of my invention, when developed into a plane tangent to their respective pitch surfaces.

From the plane of Figure 4 and from the above formulas the data for a pair of gears may be determined in such manner that the mesh between the same extends along the whole length of the gear teeth. This mesh will extend also over the whole or a large portion of the length of the pinion teeth. The gears moreover will slide while in mesh, as required, and the teeth of one will match the tooth spaces of the other.

Gears whose axes are non-intersecting and non-parallel and whose contact is along the entire tooth surface of one member of the pair are superior in strength to bevel gears of the same ratio and because of their sliding engagement have longer wear and a tendency to preserve their required tooth forms throughout their life.

Figure 5:
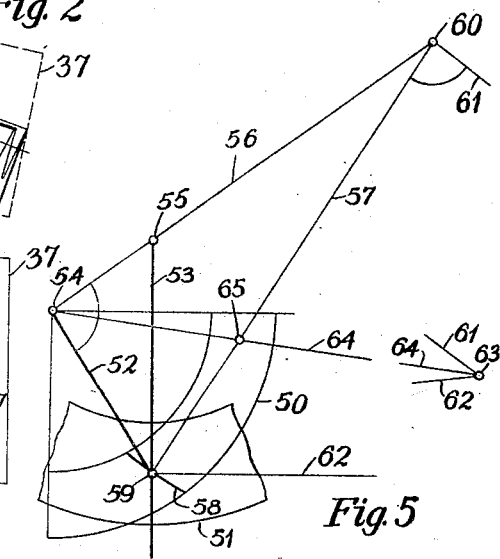
Figures 5, 6 and 7 are respectively diagrammatic views similar to Figure 4 illustrating various embodiments of the invention.
Figure 6:
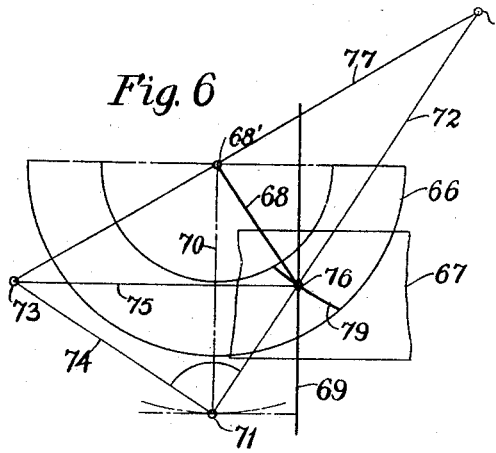
Figure 7:
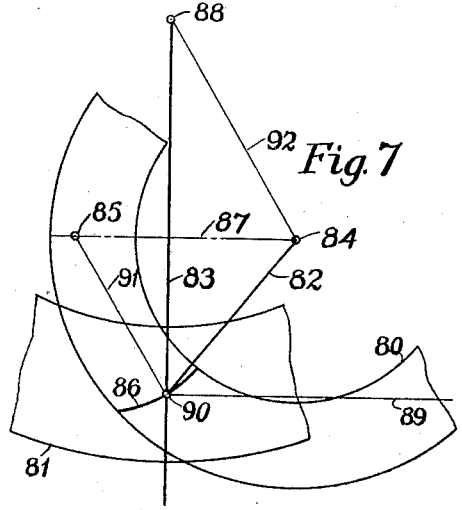
Figure 8:
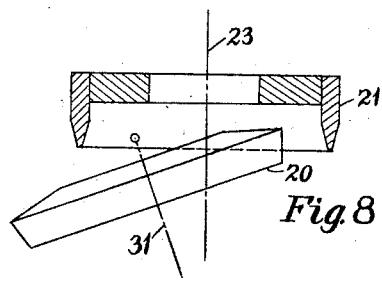
Figures 8 and 9 are respectively diagrammatic section and plan views, showing one method by which the gear, or larger member of the pair, may be produced according to this invention.
Figure 11:
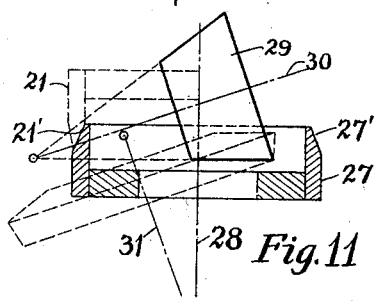
Figure 11 is a view showing diagrammatically one method of producing a pinion constructed according to this invention.
Figure 9:
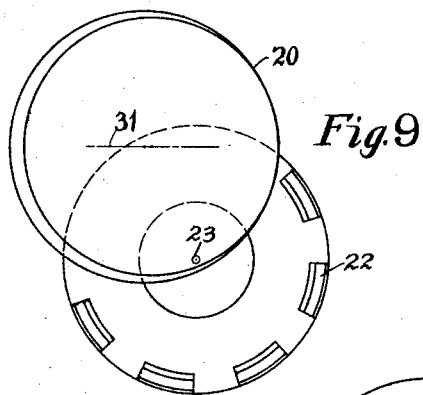
Figure 12:
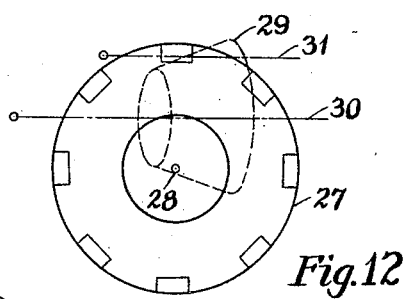
Figure 12 is a plan view showing the location of the tool and pinion blank in cutting the pinion according to the method illustrated in Figure 11.

Figures 5, 6 and 7 illustrate diagrammatically the manner of determining the proportions of various other gear pairs constructed according to this invention, to secure the desired mesh. In Figure 5, 50 and 51 are parts of the developed pitch surfaces of a gear and a pinion, constructed according to this invention, whose axes are projected into lines 52 and 53 respectively. 54 is the apex or center of the gear or wheel. The apex 55 of the pinion has been so assumed in the shown embodiment as to be situated on a perpendicular 56 to the projected gear axis 52. This arrangement will mean that in actuality the apexes of gear and pinion are on the same level. By intersecting the line 56 with the line 57 normal to the tooth profile 58 at the contact point 59, we obtain the position of the pitch point 60. By erecting a perpendicular 61 to the normal 57 at the pitch point 60 and by intersecting said perpendicular 61 with a line 62 perpendicular to the projected pinion axis 53 at the point 59, the point 63 is located. This point 63 is the instantaneous center of the normal 57. The line 64 connecting the point 63 and the gear apex 54 intersects the normal 57 at 65, and gives us the location of the center of the profile 58. The cone angles and other data for a pair of gears constructed according to this embodiment may be obtained in the maner already described with reference to Figure 4.

Figure 6 illustrates diagrammatically a pair in which one member is cylindrical. This member is somewhat similar in action to a worm or spur pinion. 66 and 67 are parts of the developed pitch surfaces of gear and pinion respectively. 68 and 69 are respectively the projected axes of gear and pinion. The apex of the pinion will be in infinity. The apex being located at the intersection point of the projected axis 69 with the line 70 connecting the center 68' of the gear with the pitch point 71, the line 70, therefore, will be parallel to the line 69. The pitch point 71 can be located by intersecting the normal 72 with the line 70. The point 73 which is the intersection point of the line 74, perpendicular to the normal 72 at the pitch point 71, with the line 75 drawn perpendicular to the projected pinion axis 69 at the contact point 76 is the instantaneous center of the normal. The line 77 connecting this point 73 with the center 68' of the gear will intersect the normal 72 at the point 78 which is the center of the longitudinal tooth curve or profile 79.

In the embodiment of my invention illustrated diagrammatically in Figure 7, 80 and 81 are parts of the developed pitch surfaces of gear and pinion respectively. 82 and 83 are the projected gear and pinion axes and 84 is the gear apex. If we assume the center 85 of the circular pitch line or longitudinal tooth profile 86 as one of the known factors the apex 88 of the pinion can then be located as follows: This point 85 is located on line 87 drawn perpendicular to the projected pinion axis 83. Line 87 is parallel to line 89 which is drawn perpendicular to the projected pinion axis 83 at the contact point 90. Lines 87 and 89 will intersect, therefore, only at infinity. The projection onto the tooth normal 91 of their intersection point is also infinitely far away. Hence the line 92 connecting the gear apex 84 and said projection point will be parallel to the normal 91. The line 92 will, therefore, intersect the projected pinion axis at its apex 88. It will be found that in this particular embodiment of my invention, the sines of the cone angles of the gear and pinion are in the exact proportion of their respective tooth numbers and moreover that the spiral teeth generated on the pinion by the method hereinbefore disclosed, to match the teeth 86 of the gear, approximate logarithmic spirals.

The data respecting any other pair of gears constructed according to this invention can be obtained in a manner similar to that described with reference to the embodiments herein disclosed. In any case, it is assumed that the pinion axis projected into the tangent plane is tangent to a line of action between the mate gears, because with this assumption, we know that if the gears are properly proportioned, they will contact along the entire tooth surface of one member of the pair and that they will have the requisite strength and desired sliding action. We can then determine from the known factors from an analysis of the mesh of the gears in the tangent plane, the proportions necessary to secure the desired mesh.

While a hypoid pair constructed according to this invention, will, preferably, be so proportioned that their tooth surfaces contact along their entire length, with the teeth of one member matching the tooth spaces of the other, it will be understood that slight departures may be made from ideal conditions, where desired, as is common in gear practice, to permit of localizing the tooth bearings or to give the pair some degree of adjustability in use, and that the present application is intended to cover such departures.

In general it may be said that while I have illustrated certain preferred embodiments of my invention, it will be understood that this invention is capable of further modification within the limits of the disclosure and the scope of the appended claims, and this application is intended to cover any variations, uses, or adaptations of my invention, following, in general, the principles of the invention and including such departures from the present disclosure as come within known or customary practice in gear cutting and may be applied to the essential features hereinbefore set forth and as fall within the scope of the appended claims.

Having thus described my invention, what I claim is:

1. A pair of hypoid-gears provided with longitudinally curved teeth, one of said gears being provided with side tooth surfaces which are surfaces of revolution.

2. A pair of hypoid-gears provided with longitudinally curved teeth, the adjacent side tooth surfaces of one of said gears being arranged in pairs which are coaxial surfaces of revolution.

3. A pair of hypoid-gears provided with curved teeth, one of said gears containing alternate longitudinally convex and concave conical side tooth surfaces.

4. A pair of hypoid-gears provided with longitudinally curved teeth, one of said gears having teeth whose side surfaces are of constant profile and the other gear having teeth conjugate to those of the first gear and molded generated.

5. A pair of hypoid gears provided with longitudinally curved teeth, one of said gears having side tooth surfaces conjugate to surfaces of revolution, the spiral angle of the teeth of said gear being larger than the spiral angle of the teeth of the mate gear, said gear being the smaller of the pair.

6. A pair of hypoid gears provided with longitudinally curved teeth, and meshing substantially along the projection of the axis of one of the gears in a plane tangent to their pitch surfaces at a mean contact point.

7. A pair of hypoid gears provided with longitudinally curved teeth, and meshing substantially along the projection of the axis of one of the gears in a plane tangent to their pitch surfaces at a mean contact point, the spiral angle of the smaller member of the pair being larger than that of the larger member of the pair.

8. A pair of hypoid-gears provided with longitudinally curved teeth, one of said gears having side tooth surfaces conjugate to surfaces of revolution, the tooth spaces of one of said gears being substantially as wide along the whole tooth space as the teeth of the mating gear are thick.

9. A pair of hypoid gears provided with longitudinally curved teeth, and so proportioned that they contact substantially along their entire side tooth surfaces, one of said gears being provided with side tooth surfaces conjugate to surfaces of revolution.

10. A pair of hypoid gears provided with longitudinally curved teeth, and meshing with the axis of one of said gears extending between the tooth portion of the mate gear and the axis of said mate gear, one of said gears being provided with side tooth surfaces conjugate to surfaces of revolution.

11. A pair of hypoid gears provided with longitudinally curved teeth, one of said gears being provided with side tooth surfaces which are surfaces of revolution, said gears being so proportioned that they contact substantially along the entire length of the side tooth surface of one member of the pair.

12. A pair of hypoid gears provided with longitudinally curved teeth, and so proportioned that their line of mesh extends substantially along the projection of the axis of one of the gears in a plane tangent to the pitch surfaces of both, one of said gears being provided with side tooth surfaces which are surfaces of revolution.

13. A pair of hypoid gears provided with longitudinally curved teeth, and so proportioned that the tooth spaces of one of said gears are substantially as wide along the whole tooth space as the teeth of the mating gear are thick, one of said gears being provided with side tooth surfaces which are surfaces of revolution.

14. A pair of hypoid gears provided with longitudinally curved teeth, and so proportioned that the spiral angle of the teeth of the smaller member of the pair is larger than the spiral angle of the teeth of the larger member of the pair, one of said gears being provided with side tooth surfaces which are surfaces of revolution.

15. A pair of hypoid gears provided with longitudinally curved teeth, and so proportioned that they contact substantially along the entire length of the tooth surface of one member of the pair, one of said gears having teeth whose side surfaces are of constant profile and the other of said gears having teeth conjugate to those of the first gear and molded generated.

16. A pair of hypoid gears provided with longitudinally curved teeth, and so proportioned that their line of mesh extends substantially along the projection of the axis of one of the gears into a plane tangent to the pitch surfaces of both, one of said gears having teeth whose side surfaces are of constant profile and the other of said gears having teeth conjugate to those of the first gear and molded generated.

17. A pair of hypoid gears provided with longitudinally curved teeth, and so proportioned that the tooth spaces of one of said gears are substantially as wide along the whole tooth space as the teeth of the mating gear are thick, one of said gears having teeth whose side surfaces are of constant profile and the other of said gears having teeth conjugate to those of the first gear and molded generated.

18. A pair of hypoid gears provided with longitudinally curved teeth, one of said gears having side tooth surfaces conjugate to surfaces of revolution.

19. A pair of hypoid gears provided with longitudinally curved teeth, one of said gears having molded generated side tooth surfaces.

20. A pair of hypoid gears provided with longitudinally curved teeth, one of said gears having molded generated side tooth surfaces, the spiral angle of the teeth of said gear being larger than the spiral angle of the teeth of the mate gear, said gear being the smaller of the pair.

21. A pair of hypoid gears provided with longitudinally curved teeth, and so proportioned that their line of mesh extends substantially along the projection of the axis of one of the gears into a plane tangent to the pitch surfaces of both at a mean contact point, one of said gears having molded generated side tooth surfaces.

22. A pair of hypoid gears provided with longitudinally curved teeth, and so proportioned that the tooth spaces of one of said gears are substantially as wide along the whole tooth space as the teeth of the mating gear are thick, one of said gears having molded generated side tooth surfaces.

23. A pair of hypoid gears provided with longitudinally curved teeth, and so proportioned as to contact along the entire length of the tooth surface of one gear, one of said gears having molded generated side tooth surfaces.

24. A pair of hypoid gears provided with longitudinally curved teeth, and meshing with the axis of the smaller gear extending between the toothed portion of the larger gear and the axis of said larger gear, said smaller gear being provided with molded generated side tooth surfaces.

ERNEST WILDHABER.